(12) United States Patent
Wegner et al.

(10) Patent No.: US 10,037,024 B2
(45) Date of Patent: Jul. 31, 2018

(54) AUTOMATED STOCHASTIC METHOD FOR FEATURE DISCOVERY AND USE OF THE SAME IN A REPEATABLE PROCESS

(71) Applicant: GM GLOBAL TECHNOLOGY OPERATIONS LLC, Detroit, MI (US)

(72) Inventors: Diana M Wegner, Bloomfield Hills, MI (US); Jeffrey A. Abell, Rochester Hills, MI (US); Michael A. Wincek, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 14/997,854

(22) Filed: Jan. 18, 2016

(65) Prior Publication Data
US 2017/0205815 A1    Jul. 20, 2017

(51) Int. Cl.
| | |
|---|---|
| G05B 19/425 | (2006.01) |
| G05B 11/42 | (2006.01) |
| G05B 13/02 | (2006.01) |
| G05B 19/21 | (2006.01) |
| G05B 19/33 | (2006.01) |
| G05B 19/39 | (2006.01) |
| G05B 19/418 | (2006.01) |

(52) U.S. Cl.
CPC ............ *G05B 19/425* (2013.01); *G05B 11/42* (2013.01); *G05B 13/0255* (2013.01); *G05B 19/21* (2013.01); *G05B 19/33* (2013.01); *G05B 19/39* (2013.01); *G05B 19/41875* (2013.01); *G05B 2219/32194* (2013.01); *G05B 2219/36219* (2013.01); *Y02P 90/22* (2015.11)

(58) Field of Classification Search
CPC combination set(s) only.
See application file for complete search history.

(56) References Cited

U.S. PATENT DOCUMENTS

| | | | |
|---|---|---|---|
| 6,362,456 B1 * | 3/2002 | Ludewig | ............... B23K 9/0956 |
| | | | 219/124.34 |
| 8,702,882 B2 | 4/2014 | Cai et al. | |
| 8,757,469 B2 | 6/2014 | Abell et al. | |
| 8,925,791 B2 | 1/2015 | Abell et al. | |
| 2010/0037161 A1 * | 2/2010 | Stading | ............... G06F 17/3043 |
| | | | 715/764 |

(Continued)

*Primary Examiner* — Dennis M Butler
(74) *Attorney, Agent, or Firm* — Quinn IP Law

(57) ABSTRACT

An automated method for discovering features in a repeatable process includes measuring raw time series data during the process using sensors. The time series data describes multiple parameters of the process. The method includes receiving, via a first controller, the time series data from the sensors, and stochastically generating candidate features from the raw time series data using a logic block or blocks of the first controller. The candidate features are predictive of a quality of a work piece manufactured via the repeatable process. The method also includes determining, via a genetic or evolutionary programming module, which generated candidate features are most predictive of the quality of the work piece, and executing a control action with respect to the repeatable process via a second controller using the most predictive candidate features. A system includes the controllers, the programming module, and the sensors.

20 Claims, 1 Drawing Sheet

(56) References Cited

U.S. PATENT DOCUMENTS

| | | | |
|---|---|---|---|
| 2011/0108181 A1* | 5/2011 | Cai | B23K 20/10 |
| | | | 156/64 |
| 2012/0209460 A1* | 8/2012 | Jacques | F01M 11/10 |
| | | | 701/22 |
| 2012/0215326 A1* | 8/2012 | Brown | G05B 11/42 |
| | | | 700/42 |
| 2013/0105556 A1* | 5/2013 | Abell | G05B 23/0221 |
| | | | 228/1.1 |
| 2013/0105557 A1 | 5/2013 | Spicer et al. | |
| 2015/0179189 A1* | 6/2015 | Dadu | G10L 15/20 |
| | | | 704/275 |
| 2015/0277396 A1* | 10/2015 | Nishida | G05B 7/02 |
| | | | 700/72 |
| 2015/0375325 A1* | 12/2015 | Flewelling | B23K 9/0956 |
| | | | 219/124.1 |
| 2017/0032281 A1* | 2/2017 | Hsu | B23K 9/0953 |

* cited by examiner

AUTOMATED STOCHASTIC METHOD FOR FEATURE DISCOVERY AND USE OF THE SAME IN A REPEATABLE PROCESS

TECHNICAL FIELD

The present disclosure relates to an automated stochastic method for feature discovery and use of the same in a repeatable process.

BACKGROUND

Various processes are repeatable, and thus lend themselves to real time process monitoring. An example of such a repeatable process is ultrasonic welding, which involves the controlled application of high frequency vibration energy to interfacing surfaces of a clamped work piece. Surface friction generates heat that ultimately softens and bonds the interfacing surfaces. For a given work piece, the formation of multiple identical welds is often performed in a consistent, repeatable manner. Another example process is the cold testing of internal combustion engines in which the performance of the engine is tested without cylinder combustion, e.g., by driving the engine via an electric motor, including static and dynamic leak testing.

Conventional process control methods for repeatable processes involve monitoring fixed control variables against calibrated thresholds. That is, various closed-loop parameter-based control techniques may be applied to maintain certain parameters within a calibrated range. For example, welding power, displacement, and acoustic signals, as well as welding frequency, may be individually monitored and compared to corresponding thresholds in a welding process. The thresholds can be adjusted over time through trial and error, experimental, or deterministic methods. Such closed-loop threshold-based approaches can produce reasonably consistent process control parameters over time. However, work pieces of a substandard quality can still be manufactured using stable process control parameters, and thus closed-loop threshold-based control approaches do not always ensure stable work piece quality over time.

SUMMARY

A random or stochastic method is disclosed herein that enables automated discovery of quality-predictive features for ultimate use in controlling a repeatable process, e.g., ultrasonic welding or engine cold testing in the non-limiting example applications noted above. As used herein, the term "feature" refers to any quantitative or qualitative variable, whether measured as raw data or derived therefrom, that may prove to be predictive of a quality of a work piece manufactured during the process. The features considered herein may be determined from the process or later during operation of the work piece, i.e., before, during, and after manufacturing, and may be univariate or multivariate in nature.

A goal of the present methodology and associated hardware is to predict manufacturing process-related quality or other events using available sensor data. It is recognized herein that detecting a problem or an event during a manufacturing process, i.e., in real time, is important to maintaining high-quality products and minimizing manufacturing and warranty costs. Root cause analysis is facilitated by such real time analysis. However, a problem that may present itself is that conventional threshold-based comparisons applied in real time do not always adequately describe the underlying quality of the work piece. Also, problems may emerge in work pieces long after leaving the manufacturing facility, even though the work pieces were, at the time of manufacturing, well within the thresholds.

Various input signals or sensor data may be used as raw time series data as part of the present method to automatically derive predictive features. Input signals may include, by way of example, manufacturing parameter signal data, telematics data, and/or warranty data. For instance, if the repeatable process is embodied as an example ultrasonic welding of a work piece, the predictive features could be used in real time to help predict whether a resultant weld would be satisfactory/passing or unsatisfactory/failing, or at least suspect and worthy of further analysis and testing to determine quality.

Non-limiting example work pieces whose manufacturing process may be enhanced by the present approach include ultrasonic welding of carbon fiber components or tabs of a multi-cell battery module, cold testing of an engine, or any other repeatable process. While the present approach is not limited to such processes, an example battery module is representative of the type of system in which the present feature discovery method may have particular utility. Therefore, an example battery module is used throughout the remainder of this disclosure for illustrative consistency without limiting the approach to such applications.

In a particular embodiment, an automated stochastic method for discovering features in a repeatable process includes measuring raw time series data during the repeatable process using a set of sensors. The raw time series data describes multiple parameters of the repeatable process. The method includes receiving, via a first controller, the raw time series data from the sensors, and then stochastically generating candidate features from the raw time series data using one or more logic blocks of the first controller. The candidate features are predictive of a quality of a work piece manufactured via the repeatable process. Furthermore, the method includes determining, via an evolutionary or genetic programming module, which of the generated candidate features are the most predictive of the quality of the work piece. A control action is then executed via the second controller with respect to the repeatable process using the most predictive candidate features, including applying a rule to the predictive candidate features and making a binary control decision with respect to the work piece.

The first controller may include one or more of a signal fusion logic block operable for fusing multiple signals from the raw time series data, a mapping logic block that processes the raw time series data through objective and/or fitness functions, a signal feature transformation logic block that transforms the raw time series data into an alternative space, and a time selection logic block that is operable to vary a time horizon of the raw time series data.

A system is also disclosed for discovering features in a repeatable process. In an embodiment, the system includes the set of sensors operable for measuring raw time series data during the repeatable process, the first controller programmed to receive the raw time series data from the sensors, and to stochastically generate candidate features from the raw time series data using one or more logic blocks, the genetic or evolutionary programming module operable for determining which of the generated candidate features are most predictive of the quality of the work piece, and the second controller programmed to execute a control action with respect to the repeatable process via using the most predictive candidate features from the genetic or evolutionary programming module.

The above features and advantages and additional features and advantages of the present disclosure are readily apparent from the following detailed description of the best modes for carrying out the disclosure when taken in connection with the accompanying drawings.

DETAILED DESCRIPTION

Figure 1:
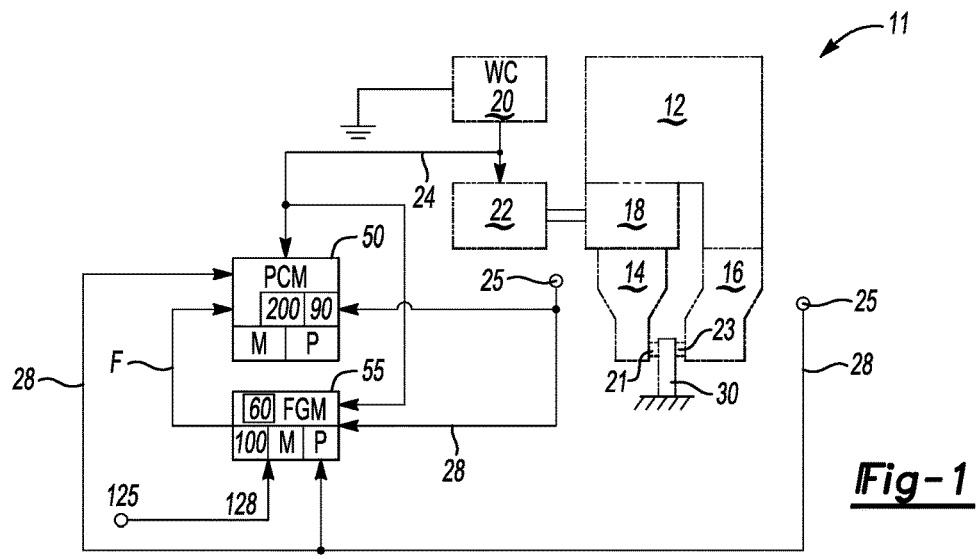
FIG. 1 is a schematic illustration of an example repeatable process and a system programmed to stochastically discover and apply predictive features during or after the repeatable process.

Referring to the drawings, wherein like reference numbers refer to like components throughout the several Figures, a repeatable process 11 is shown schematically in FIG. 1 for manufacturing of a work piece 30. The repeatable process 11 uses respective first and second controllers in the form of a feature generation module (FGM) 55 and a process control module (PCM) 50, with the FGM 55 used to generate predictive features in a random or stochastic manner and the PCM 50 programmed to use the same, e.g., in the overall control of the repeatable process 11 and/or for target product recalls as explained herein. The generated features, which may be automatically derived from sensor data (arrows 28, 128), are thereafter iteratively processed by the FGM 55 ver time as the FGM 55 learns the most predictive of these features via evolutionary programming. The FGM 55 is programmed to execute a method 100 as described below with reference to FIGS. 2 and 3, respectively.

As will be appreciated by those of ordinary skill in the art, each application will have its own set of relevant functions and features, and therefore the example features and functions, signals, and applications set forth below are intended to be illustrative and non-limiting. In a non-limiting example embodiment, the repeatable process 11 of FIG. 1 may be an ultrasonic welding process, such as one in which the work piece 30 is embodied as a multi-cell battery module, e.g., a battery pack for a vehicle or other system. The repeatable process 11 may be monitored in real-time using process sensors 25 that collect the sensor data (arrow 28) describing different process control variables or parameters as raw time series data, e.g., voltages, currents, resistances, displacements, pressures, temperatures, etc. Additionally, post-manufacturing performance of the work piece 30 may be periodically monitored over time using additional sensors 125. For instance, the additional sensors 125 may include remote sensors such as telematics sensors of a vehicle or other top-level system or assembly which are operable to manually or automatically collect additional sensor data (arrow 128) describing the post-manufacturing performance, including warranty repair or diagnostic data collected remotely such as by a dealership, repair facility, or cold testing cell.

The sensor data (arrows 28, 128) is ultimately collected and transmitted to the FGM 55 and used thereafter to conduct the method 100, and to thereby generate and iteratively discover quality-predictive features. Such features may be applied in real time in the repeatable process 11. As a result, the method 100 is adaptive in the sense that over time, the composition of the predictive features may change and adapt to conditions, becoming more and more predictive of quality, which should ultimately reduce failure rates to minimal levels. The method 100 is thus intended to generate predictive feature sets usable by the PCM 50 to predict, in real time, a binary quality of the work piece 30, e.g., of a weld formed on a surface of the work piece 30.

A particular challenge faced in manufacturing is an overwhelming abundance of available process signal data coupled with a lack of conventional means for deriving features that are truly predictive of the quality of the work piece 30, or of the operation being performed on the work piece 30. The FGM 55 is therefore programmed with instructions embodying the method 100 to help solve this particular problem, specifically by using an automated methodology of random or stochastic feature discovery. That is, the present approach generates descriptive features formed from one or multiple process parameters that are the most predictive of quality, with the generated predictive features (arrow F) ultimately transmitted to and applied by the PCM 50 using existing binary classification approaches such as a box-void methodology to select best features combinations.

The non-limiting example repeatable process 11 of FIG. 1 includes a welding assembly 12. The welding assembly 12 includes a sonotrode/welding horn 14 and a welding anvil 16, along with other welding tools and components as described below. The PCM 50 is configured to monitor various control signals provided by a power supply/welding controller (WC) 20 and/or measured by the sensors 25 positioned with respect to the welding assembly 12. The PCM 50, using the predictive features (arrow F) generated by the FGM 55, can predict, online and in real time, whether the welding assembly 12 has produced an objectively passing/good weld or an unsatisfactory or suspected bad/suspect weld. Welds of undetermined or suspect quality may then be subjected to direct end-of-line inspection such as manual picking to verify the presence of and isolate any unsatisfactory/bad welds. In turn, process data gleaned from verified bad welds, whether at end-of-line picking or from warranty source, may be transmitted to the FGM 55 as described herein to improve the predictive accuracy of the method 100.

As will be understood by those of ordinary skill in the art, a welding controller/power supply used for vibration welding, such as the welding controller 20 of FIG. 1, may be electrically-connected to a suitable energy source, typically a 50-60 Hz wall socket. The welding controller 20 may include voltage rectifiers, transformers, power inverters, and/or other hardware that ultimately transforms the source power, whatever its form, into the welding control signals (arrow 24). The welding control signals (arrow 24) ultimately command predetermined waveform characteristic(s), for example a periodic signal having a frequency of about 20 kHz to about 40 kHz or more depending on the particular welding application. Other process information may be included in the welding control signals (arrow 24), including but not limited to power traces, displacement of the welding horn 14, vibration frequency, trigger signals, parameter limit alarms, weld controller fault information, etc.

Still referring to FIG. 1, the equipment used in the repeatable process 11 may also include a converter 22 having mechanical structure sufficient for producing a mechanical vibration of the welding horn 14 in response to the welding control signals (arrow 24). The welding horn 14 typically includes a knurl pattern 21, typically bumps and/or ridges, which are suitable for gripping and holding the work piece 30 when the work piece 30 is clamped between the welding horn 14 and the anvil 16. The anvil 16 typically includes a similar knurl pattern 23. A booster 18, i.e., an amplifier, can be used to increase the amplitude of commanded mechanical vibrations from the welding controller 20 as needed.

The PCM 50 and the FGM 55 receive the sensor data (arrow 28) from the sensors 25 positioned with respect to the welding assembly 12, doing so as time series data in real time. As used herein, real time means concurrently with formation of welds in the work piece 30, or concurrently with manufacturing of the work piece 30 in other embodiments outside of the realm of welding. In general, the PCM 50 and FGM 55 may be embodied as one or more computer devices. The PCM 50 is continuously apprised, via receipt of the welding control signals (arrow 24), of instantaneous values of any waveforms transmitted to the welding horn 14 by the welding controller 20, as well as of other values known by or internal to the welding controller 20. The FGM 55 receives the additional sensor data (arrows 128) from the sensors 125 and processes the received additional sensor data (arrows 128). The additional sensor data (arrow 128) could be used to evaluate features of the weld when it was originally formed, e.g., by processing historical time series data for the work piece 30 and finding new features that may be predictive of long-term quality.

In an example embodiment, one or more of the sensors 25 may be configured as an acoustic sensor, for instance a microphone or an acoustic emission sensor positioned in direct contact with a surface of the welding horn 14 of FIG. 1. The sensor(s) 25 may measure the acoustic frequency welding horn 14 of FIG. 1 over time, with this value used by the FGM 55 as a signal from which other candidate features may be extracted and modeled. Another sensor 25 may measure a changing linear displacement of the welding horn 14 over time. Other example sensors 25 may be used to detect any other desirable values, such as changing welding temperature and/or other atmospheric information such as relative humidity and ambient temperature that might affect weld quality.

The PCM 50 and the FGM 55 each includes a processor (P) and tangible, non-transitory memory (M). The memory (M) may include read only memory, flash, optical, and/or other non-transitory memory, as well as transitory memory, e.g., any required random access memory, electrically-programmable read-only memory, etc. Additional circuitry such as a high-speed clock, analog-to-digital circuitry, digital-to-analog circuitry, a digital signal processor, and the necessary input/output devices and other signal conditioning and/or buffer circuitry are also included as the structure of the PCM 50 and the FGM 55.

As part of the method 100 described below, the FGM 55 in particular is programmed with logic embodying a stochastic generation module (SGM) 60 as described in detail below with reference to FIG. 2. In a possible embodiment, the FGM 55 receives the sensor data (arrow 28, 128) as input signals from the sensors 25 and 125, and may also receive the welding control signals (arrow 24) from the welding controller 20 describing real time, in-process process control values. For instance, depending on the nature of the repeatable process 11 of FIG. 1, the FGM 55 may be apprised over time of oil pressure, temperature, etc., or electrical welding current, voltage, and/or power, welding frequency, and/or other possible waveforms or values, and may derive from the sensor data (arrows 28, 128) additional features related to peak values, which may encompass peak magnitudes, locations, counts, durations, and/or distances between such peak values. Likewise, the derived additional features may include data triplets, durations, counts, derivatives, integrals, slopes, areas, area ratios, moving averages, and the like. Each feature is a candidate feature, i.e., a feature that may be further processed alone or with other candidate features to derive the predictive features (arrow F) that are ultimately determined to be the most predictive of a binary or other quality of the work piece 30. The PCM 55 can thereafter apply a feature-specific rule to the predictive features (arrow F) to predict quality of the work piece 30 in real time or even long after manufacturing.

Likewise, the additional sensors 125 may provide warranty or in-operation information such as battery temperature, ambient temperature, engine or motor speeds, fluid leak data, vehicle speeds, battery state of charge, voltage, or current, road forces, or any other data that might be relevant to determining factors that could adversely affect or help determine weld quality over time. Error codes, warning flags, or messages that may be generated may be considered. In other non-welding applications the range and type of data may vary, e.g., including engine speed, vehicle speed, braking force, and the like, without departing from the intended inventive scope.

Non-limiting example candidate features for consideration by the FGM 55 of FIG. 1 include the total welding energy, defined as an area under a power curve or primary welding frequency commanded from the welding controller 20 of FIG. 1. Other candidate features may include the elapsed time in forming a given weld in a weld series 142, peak power, rise time, ramp rate, or correlation data, for instance between a reference signal and the welding signal. First, second, third, or other derivatives or integrals of a given signal may be used for this purpose as well as other possible features such as time/location of events, peak data, acceleration, velocity, etc. As noted above, the location, magnitude, duration, distance between, or other characteristic of peak values or other values may also be considered. Ultimately, an associated rule may be applied by a feature selection module 90 to the most predictive feature(s) (arrow F) using feature application logic 200, e.g., the well-known box-void process, to thereby predict the quality in real time and execute other control actions with respect to the repeatable process 11 and/or the work piece 30.

Figure 2:
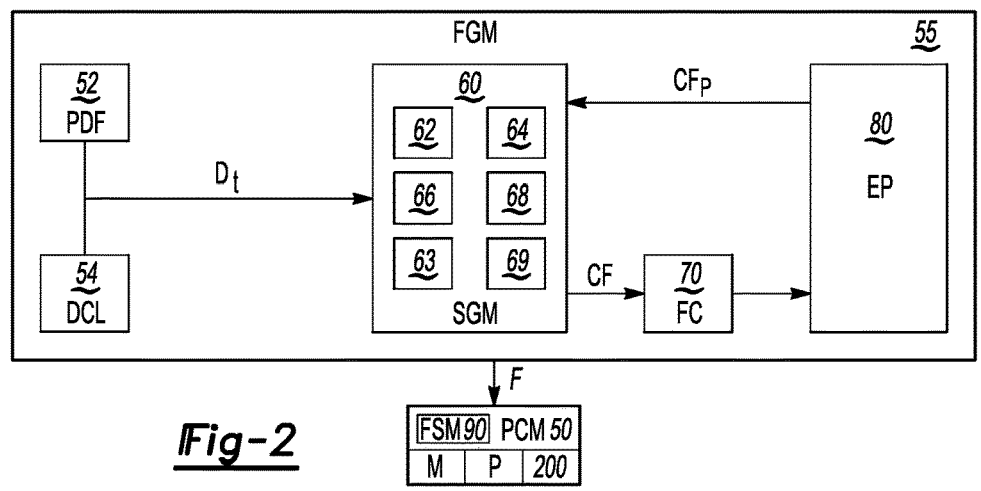
FIG. 2 is a schematic logic diagram of hardware and software components of the system shown in FIG. 1.

Referring to FIG. 2, the feature generation module (FGM) 55 of FIG. 1 is described in greater detail in terms of internal logic modules and signal flow. As used herein, the term "module" refers to a combination of required hardware and software needed for receiving, processing, and outputting the indicated values, with the predictive features (arrow F) generated by the FGM 55 ultimately used in a process-specific model or process specific to the application, e.g., battery tab welding, valve seat placement, etc. Signal information refers to any electronic signals communicated between different modules of the FGM 55, or from the FGM 55 to the PCM 50 of FIG. 1, in the execution of method 100.

A problem definition function (PDF) is applied at PDF logic block 52. Here, any initially-defined process data breadth, depth, and scope is broadly considered. The sensors 25, 125 may be configured and added to the repeatable process 11 of FIG. 1 based on the problem as defined in logic block 52. For instance, when welding a set of conductive electrodes or battery tabs, various sensors 25 may be positioned with respect to the welding controller 20, the welding horn 14, the anvil 16, and/or other structural elements used in the repeatable process 11 and used to measure relevant control parameters that may be useful in determining the resultant weld quality, either by themselves, in combination with other signals, or using statistical analysis of such information.

A data conditioning library (DCL) 54 is also used to gather time series data ($D_t$) and other process data. The time series data ($D_t$) may be filtered or conditioned as needed, for instance with respect to balance, scale, etc. Thus, between the PDF logic block 52 and the DCL 54, time series data (arrow Dt) is collected during the repeatable process 11 and used by the logic of a stochastic generation module (SGM) 60 as a core part of the method 100.

With respect to the SGM 60, this particular block may be embodied as instructions recorded on the memory (M) of the FGM 55 shown in FIG. 1 and executed by required hardware components of the FGM 55. The SGM 60 may include multiple independent or collaboratively operable logic blocks 62, 63, 64, 66, 68, and 69. Using these logic blocks, the SGM 60 ultimately generates and outputs candidate features (arrow CF) to a feature catalogue (FC), from which a genetic programming tool or an evolutionary programming (EP) module 80, e.g., EUREQA by NUTONIAN, DATA MODELER from EVOLVED ANALYTICS, or RGP available in the public domain, determines the predictive candidate features (arrow $CF_P$). As is well known in the art, generic and evolutionary programming approaches use mathematical tools with a symbolic manipulator for stochastic optimization.

The predictive candidate features (arrow $CF_P$) determined by the EP 80 as a subset of the candidate features (arrow CF) are returned to the SGM 60 for further processing and refinement. The most predictive or best of the predictive candidate features (arrow $CF_P$) may be returned to the PCM 50 as the predictive features (arrow F) to which a rule is applied by the feature selection module (FSM) 90 to predict weld or other quality, or offline to conduct a targeted recall of only those already manufactured work pieces 30 possibly having the predictive features (arrow F).

The feature selection module (FSM) 90 of FIGS. 1 and 2 may be optionally embodied as a conventional box-void process, wherein the term "box" defines a void as an orthotype of a specific shape and orientation. As is known in the art, the sides of the box are either parallel to or orthogonal to the axes in a standard orthogonal coordinate system, e.g., the x and y axes in a two-axis coordinate system. Equivalently, the sides of the box are aligned with the standard orthogonal axes. In two dimensions the box is a rectangle while in three dimensions the box is a rectangular parallelepiped, and in both cases the sides are aligned with the standard orthogonal axes. Thus, the term "box" refers to any orthotype whose sides are aligned with the standard orthogonal axes. Use of such a box-void method 200 or other method by the PCM 50 enables the PCM 50 to determine the dimensional space or largest "box void" that encompasses most of the good welds and excludes all or substantially all, e.g., at least 90%, of the bad welds.

With respect to the SGM 60 in particular, each of the logic blocks 62, 63, 64, 66, 68, and 69 of FIG. 2 may be used together or separately to achieve the desired predictive accuracy. Logic block 62 functions as a top-level feature or signal fusion logic block within the overall architecture of the SGM 60. Inputs to signal fusion logic block 62 include the set of predictive candidate features (arrow $CF_P$) output from the EP 80 as well as transformation space features from logic block 68. Logic block 62 ultimately determines from the time series data (arrow Dt), and possibly the transformation space features from logic block 68, the data that is most predictive of quality of the work piece 30. Within the signal fusion logic block 62, for instance, the processor P may compare known or verified good welds with data from each of the time series data and transformation space data, discarding data that is not correlated with good welds. Logic block 62 may also fuse data or features to form composite features as a new feature, i.e., as defined by a total signature of multiple different signals and in multiple transformation spaces, with transformation described below with reference to logic block 68.

Logic block 64 is intended to operate as a deterministically-generated feature logic block. In logic block 64, the predictive candidate features (arrow $CF_P$) may be externally or manually generated using prior knowledge, physics, or the like, and thus via methodologies different from those used to automatically generate features in the other logic blocks. The raw time series data (arrow Dt) may be used as an input, along with space-transformed time series signal data from the logic block 68 described below. The various candidate features (arrow CF) may be estimated and/or combined in logic block 64 using constant terms, multipliers, or operations to generate process meta-variables or composite features. The output of logic block 64 may be a set of additional candidate features (arrow CF) added to a feature catalogue (FC) 70.

Logic block 66 is a mapping logic block that, unlike the other logic blocks described herein, evaluates the raw time series data (arrow Dt) and other possible signal performance using a set of objective functions having operators and constants. Appropriate objective and/or fitness functions may be selected by mapping logic block 66 and prioritized based on the nature of the repeatable process 11, with an optional optimizer block 63 providing the coefficients in a manner that optimizes the function. An example function includes the known box-void method described herein, albeit applied at the candidate feature level rather than in real time process control as in the method 200 used by the PCM 50. Other non-limiting example functions include the known Matthews correlation coefficient, accuracy, area under ROC curve, and binary order methods, or the confusion matrix, distance from corner, or weighted accuracy methods.

Logic block 68 performs signal feature transformation. Based on the application, for instance, logic block 68 can select a particular transformation search space and transform the raw time series data (arrow Dt) into an alternative space. By way of example, the time series data (arrow Dt) may be converted to the frequency domain to determine if more predictive features may be present in the transformed space. Fourier transformation and wavelet transformation are other possibilities for the logic block 68. As with the other logic blocks, the logic block 68 outputs its own candidate features (arrow CF) to the feature catalogue 70 for eventual processing by the EP 80.

Logic block 69 uses sensor time selection methods, e.g., multi-window and varied time horizons, to provide yet another set of candidate features (arrow CF) to the feature catalogue 70. Time horizons for multiple sensor data (arrows 28, 128) of FIG. 1, are inputs, as captured in the DCL 54. Logic block 69 defines the varied time horizon data fusion method that is best suited for the application and the available raw time series data (arrow Dt), and may try different time horizons or windows to find more predictive candidate features to find the best or most predictive time period. For instance, if a weld takes fifty different data points over time, logic block 69 may evaluate different portions of the fifty data points to determine if, e.g., the welding power over a duration defined by the middle five data points is more determinative of weld quality than the welding power over a duration defined by the first five data points.

Figure 3:
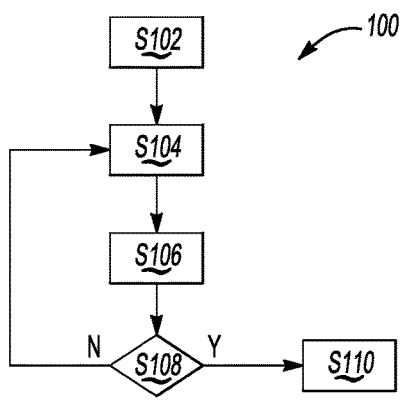
FIG. 3 is a flow chart describing an example method for automated stochastic feature discovery in a repeatable process such as that shown in FIG. 1.

FIG. 3 describes an example embodiment of the method 100 as performed using the PCM 50 and FGM 55 described above. The method 100 begins with step S102, wherein the FGM 55 receives the raw time series data (arrow Dt) of FIG. 2 from the sensors 25 and 125 or other sources as shown in FIG. 1, e.g., the sensor data (arrows 24, 28, 128) and any other available data. Step S102 may include filtering the raw series data (arrow Dt) as needed using a suitable data filter, e.g., to eliminate signal noise. The method 100 then proceeds to step S104.

At step S104, the SGM 60 of FIG. 2 continues to process the raw time series data (arrow Dt) as set forth above. For instance, the SGM 60 may construct an initial population of candidate features (arrow CF) using the logic block 64 described above. Multi-objective function mapping of logic block 66 may be randomly applied for application-specific requirements. The SGM 60 may also apply random signal feature transformation and search methodologies via logic block 68 to determine the appropriate transformation search spaces, and to transform the time-series data (arrow Dt) to such spaces. Likewise, logic block 69 can be used to vary the time horizon of the raw time-series data (arrow Dt) or any of the transformed space data. Ultimately, logic block 62 may fuse the candidate features determined by any of the other logic blocks or from multiple sensors 25 and/or 125 of FIG. 1 to form yet another set of candidate features (arrow CF). Any or all of the various logic blocks 62, 63, 64, 66, 68, and 69 may be used as part of step S104 depending on the application and the predictive value of the processes used by each of the blocks. The method 100 then proceeds to step S106.

At step S106, the candidate features (arrow CF) from the SGM 60 are output to the feature catalogue 70 and temporarily stored therein. Essentially, the functions of the SGM 60 populate the feature catalogue 70 with a preliminary set of the candidate features (arrow CF), which have been created by the SGM 60 in a stochastic manner using multiple different processes of the SGM 60 as explained above. The method 100 then proceeds to step S108.

At step S108, the preliminary set of candidate features (arrow CF) is iteratively processed using evolutionary or genetic programming via the EP module 80 to continuously refine the set of candidate features (arrow CF) in the feature catalogue 70 until no further improvements in predictive quality are found. Thus, at step S108 the FGM 55 of FIG. 1 determines, via the EP 80, which of the candidate features (arrow CF) in the feature catalogue 70 are best or most predictive of the quality of the work piece 30, and then returns those features to the SGM 60 as predictive candidate features (arrow $CF_P$) for further evaluation.

The FGM 55 may, in subsequent iterations, try different combinations of features to generate more candidate features (arrow CF), and the EP module 80 may compare the new candidate features (arrow CF) to the last set of predictive candidate features (arrow $CF_P$) from previous iterations, and so forth. The method 100 proceeds to step S110 when the predictive candidate features (arrow $CF_P$) returned by the EP module 80 are unchanged, i.e., when the same predictive candidate features (arrow $CF_P$) continue to be returned by the SGM 60. That is, the method 100 continues until any generated candidate features (arrow CF) from the FGM 55 are the same as the most predictive candidate features (arrow $CF_P$) from the EP module 80. When this happens, the method 100 continues to step S110.

At step S110, the FGM 55 outputs to the process control module (PCM) 50 the predictive candidate features (arrow $CF_P$) determined via steps S102-S108 as being most predictive of quality after multiple iterations. The features output to the PCM 50 are the predictive features (arrow F) of FIGS. 1 and 2. The PCM 50 can use the feature selection module 90 and its feature application logic 200, e.g., the box-void process or other suitable processes, to predict quality in real time, or can go back to historical time series data (arrow $D_t$) to find new features that may be used for targeted or user-specific maintenance or warranty repairs.

As an example control action of step S110, the PCM 50 could apply a rule associated with the predictive candidate features (arrow $CF_P$) in real time, e.g., as a weld, engine, or other work piece 30 is being formed or was just completed, with the rule defining the pass/fail limits, boundaries, thresholds, or other quality parameter of the work piece 30 with respect to the predictive candidate features (arrow $CF_P$). Step S110 may also include modifying the work piece 30 and/or a parameter of the repeatable process 11 to correct the failure as a tangible, preventative or corrective control action. The PCM 50 could then record the location and identifying criteria of the work piece 30 failing the rule, and command a remedial action such as end of line picking of a bad weld or further testing or inspection of an engine to verify the binary quality, potentially collecting additional data from the results and feeding such data back into the method 100. In this manner, indicia of a rejected or failing work piece 30 may be recorded in memory (M) of the PCM 50.

By using the method 100 it may be possible to detect problems or events during and after the manufacturing process by allowing data to stochastically determine the relevant features and iteratively determining and applying only the most predictive of such generated features, to aid root cause analysis, and potentially reduce warranty costs relative to conventional threshold-based process control methods and reactive repair strategies. Using the FGM 55, for instance, it may be possible to proactively recall only a small affected subset of products prior to failure by determining, based on the predictive features (arrow F), that the work piece 30 may be more prone to failure based on the features detected in real time or after manufacturing.

While the best modes for carrying out the disclosure have been described in detail, those familiar with the art to which this disclosure relates will recognize various alternative designs and embodiments for practicing the disclosure within the scope of the appended claims.

The invention claimed is:

1. An automated method for identifying quality-predictive features of a repeatable process, the method comprising:
   measuring raw time series data during the repeatable process using a set of sensors, wherein the raw time series data describes multiple parameters of the repeatable process;
   receiving, via a first controller, the raw time series data from the set of sensors;
   stochastically generating candidate features from the raw time series data using the first controller, wherein the candidate features are predictive of a quality of a work piece manufactured via the repeatable process;
   determining, via a genetic or evolutionary programming module employing mathematical tools with a symbolic manipulator for stochastic optimization, a predictive features set of the generated candidate features that is more predictive of the quality of the work piece than a predictive candidate features set of the generated candidate features; and
   executing a control action with respect to the repeatable process via a second controller using only the predictive features set, the control action including determining the quality of the work piece by applying a rule to the predictive features set, and modifying at least one of the work piece and a parameter of the repeatable process based on the determined quality.

2. The method of claim 1, further comprising measuring additional sensor data using additional sensors positioned external to the repeatable process.

3. The method of claim 2, wherein the additional sensor data includes warranty repair data.

4. The method of claim 1, wherein the first controller includes a plurality of logic blocks each operable for generating the candidate features in a different manner.

5. The method of claim 1, wherein the first controller comprises a plurality of logic blocks that includes:
a signal fusion logic block operable for fusing multiple signals from the time series data,
a mapping logic block that processes the time series data through objective functions,
a signal feature transformation logic block that transforms the raw time series data into an alternative space, and
a time selection logic block that is operable to vary a time horizon of the time series data.

6. The method of claim 5, wherein the plurality of logic blocks further includes a deterministically-generated feature logic block operable to estimate candidate features using constant terms, multipliers, and/or operations to generate process meta-variables and/or composite features.

7. The method of claim 1, wherein executing a control action with respect to the repeatable process via the second controller includes applying the rule using a box-void method.

8. The method of claim 1, wherein the repeatable process is an ultrasonic welding process, and wherein executing a control action includes rejecting welds formed on the work piece using the second controller and the predictive features set.

9. The method of claim 8, wherein the multiple parameters of the repeatable process include an electrical current, a voltage, an electrical power, an/or an acoustic frequency, and wherein the candidate features include a peak value, a derivative, an integral, a slope, an area, an area ratio, and/or a moving average.

10. The method of claim 1, further comprising iteratively processing the predictive features set through at least one logic block of the first controller and the genetic or evolutionary programming module until the generated candidate features from the first controller are the same as the predictive features set from the genetic or evolutionary programming module.

11. The method of claim 1, wherein determining the predictive features set further includes employing a sensor time selection method that evaluates multiple windows and varied time horizons during the repeatable process to identify a first candidate feature that is more predictive of the quality of the work piece than a second candidate feature.

12. A system for discovering quality-predictive features in a repeatable process, the system comprising:
a set of sensors operable for measuring raw time series data during the repeatable process, wherein the raw time series data describes multiple parameters of the repeatable process;
a first controller programmed to receive the raw time series data from the set of sensors, and to stochastically generate candidate features from the raw time series data using at least one logic block, wherein the candidate features are predictive of a quality of a work piece manufactured via the repeatable process;
a genetic or evolutionary programming module employing mathematical tools with a symbolic manipulator for stochastic optimization to determine a predictive features set of the generated candidate features that is more predictive of the quality of the work piece than a predictive candidate features set of the generated candidate features; and
a second controller programmed to receive the predictive features set and to execute a control action with respect to the repeatable process using only the predictive features set from the genetic or evolutionary programming module, the control action including determining the quality of the work piece by applying a rule to the predictive features set, and then modifying at least one of the work piece and a parameter of the repeatable process based on the determined quality.

13. The system of claim 12, wherein the at least one logic block includes a plurality of logic blocks each operable for generating the candidate features in a different manner.

14. The system of claim 12, wherein the first controller comprises a plurality of logic blocks that includes:
a signal fusion logic block operable for fusing multiple signals from the time series data,
a mapping logic block that processes the time series data through objective functions,
a signal feature transformation logic block that transforms the raw time series data into an alternative space, and
a time selection logic block that is operable to vary a time horizon of the time series data.

15. The system of claim 14, wherein the plurality of logic blocks further includes a deterministically-generated feature logic block operable to estimate candidate features using constant terms, multipliers, and/or operations to generate process meta-variables and/or composite features.

16. The system of claim 12, wherein the second controller is programmed to execute a control action by applying the rule using a box-void method.

17. The system of claim 12, wherein the repeatable process is an ultrasonic welding process and the control action includes recording, in memory of the second controller, an indicia of rejected welds formed on a work piece.

18. The system of claim 17, wherein the multiple parameters of the ultrasonic welding process include an electrical current, a voltage, an electrical power, and/or an acoustic frequency, and wherein the candidate features include a peak value, a derivative, an integral, a slope, an area, an area ratio, and/or a moving average.

19. The system of claim 12, wherein the first controller and the genetic or evolutionary programming module are operable for iteratively processing the predictive features set through the at least one logic block until the generated candidate features from the first controller are the same as the predictive features set from the evolutionary programming module.

20. An automated method for identifying quality-predictive features for use in controlling a repeatable welding process, the method comprising:
receiving, via a first controller, sensor data from a set of sensors measuring the sensor data during the repeatable welding process, the sensor data being indicative of multiple parameters associated with the repeatable welding process;
stochastically generating, via the first controller, a plurality of candidate features from the sensor data, the candidate features being predictive of a weld quality of a weld formed on a workpiece by the repeatable welding process, wherein the candidate features are generated using composite-feature forming data fusion logic, process meta-variable generating deterministic logic, and objective-function based mapping logic, signal feature transformation logic;

processing, via the first controller, the generated candidate features to derive a set of predictive features and a set of predictive candidate features, the first controller using multiple-window varied-time-horizon based sensor time selection and a genetic or evolutionary programming module with a symbolic manipulator to determine that the set of predictive features is more predictive of the weld quality than the set of predictive candidate features;

transmitting the set of predictive features by the first controller to a second controller; and executing, via the second controller, a control action with respect to the repeatable welding process using only the transmitted set of predictive features, the control action including applying a rule to the set of predictive features and modifying a parameter of the repeatable welding process based on the determined quality.

* * * * *